(12) United States Patent
Nagaoka

(10) Patent No.: US 9,098,077 B2
(45) Date of Patent: Aug. 4, 2015

(54) TRAJECTORY CONTROL DEVICE

(75) Inventor: Kotaro Nagaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 13/814,758

(22) PCT Filed: Jul. 28, 2011

(86) PCT No.: PCT/JP2011/067333
§ 371 (c)(1),
(2), (4) Date: Feb. 7, 2013

(87) PCT Pub. No.: WO2012/026279
PCT Pub. Date: Mar. 1, 2012

(65) Prior Publication Data
US 2013/0138236 A1     May 30, 2013

(30) Foreign Application Priority Data
Aug. 25, 2010   (JP) ................................. 2010-188833

(51) Int. Cl.
*G06F 19/00*     (2011.01)
*G05B 11/01*     (2006.01)
(Continued)

(52) U.S. Cl.
CPC .............. *G05B 13/02* (2013.01); *G05B 19/19* (2013.01); *G05B 19/404* (2013.01);
(Continued)

(58) Field of Classification Search
CPC ............... G05B 13/02; G05B 19/19; G05B 2219/42342; G05B 2219/34135; G05B 19/4103; G05B 19/4097; G05B 19/41; G05B 19/416; G05B 19/404; G11B 19/28

USPC .......................... 700/186–190; 318/560, 567
See application file for complete search history.

(56) References Cited

U.S. PATENT DOCUMENTS 3,576,981 A * 5/1971 Okamoto et al. ............. 708/270
3,684,874 A * 8/1972 Kelling ......................... 318/572
(Continued)

FOREIGN PATENT DOCUMENTS

| JP | 5 250002 | 9/1993 |
| JP | 6 282321 | 10/1994 |

(Continued)

OTHER PUBLICATIONS

International Search Report Issued Oct. 25, 2011 in PCT/JP11/67333 Filed Jul. 28, 2011.

*Primary Examiner* — Ronald Hartman, Jr.
(74) *Attorney, Agent, or Firm* — Oblon, McClelland, Maier & Neustadt, L.L.P.

(57) ABSTRACT

A trajectory control device controlling a trajectory of a movable portion includes a servo-system response-trajectory calculation unit that computes a servo-system response trajectory based on a position command of each movable axis, a shape-feature determination unit that outputs a shape feature amount including information of a position of a boundary point in a path shape and a running direction near the boundary point based on a determination from the position command whether the shape of the commanded path is straight or curved line, a position-vector correction unit that corrects a position vector based on the position command, the servo-system response trajectory and the shape feature amount, and outputs a corrected position command, and servo control units that control a motor of each movable axis by outputting a motor drive torque so that a position of each movable axis follows the corrected position command.

7 Claims, 7 Drawing Sheets

(51) Int. Cl.
  *G05B 19/10* (2006.01)
  *G05B 13/02* (2006.01)
  *G05B 19/19* (2006.01)
  *G05B 19/4103* (2006.01)
  *G05B 19/4097* (2006.01)
  *G05B 19/41* (2006.01)
  *G11B 19/28* (2006.01)
  *G05B 19/416* (2006.01)
  *G05B 19/404* (2006.01)

(52) U.S. Cl.
  CPC ............ *G05B 19/4097* (2013.01); *G05B 19/41* (2013.01); *G05B 19/4103* (2013.01); *G05B 19/416* (2013.01); *G05B 2219/34135* (2013.01); *G05B 2219/42342* (2013.01); *G11B 19/28* (2013.01)

(56) References Cited

U.S. PATENT DOCUMENTS

| | | | |
|---|---|---|---|
| 4,754,208 A * | 6/1988 | Nakajima et al. | 318/574 |
| 5,406,494 A * | 4/1995 | Schuett | 700/188 |
| 5,416,716 A * | 5/1995 | Zeman et al. | 700/187 |
| 5,659,480 A * | 8/1997 | Anderson et al. | 700/186 |
| 5,835,874 A * | 11/1998 | Hirata et al. | 701/50 |
| 6,140,787 A * | 10/2000 | Lokhorst et al. | 318/568.18 |
| 6,311,098 B1* | 10/2001 | Higasayama et al. | 700/159 |
| 6,757,583 B2* | 6/2004 | Giamona et al. | 700/189 |
| 6,922,606 B1* | 7/2005 | Yutkowitz | 700/187 |
| 7,130,718 B2* | 10/2006 | Gunnarsson et al. | 700/254 |
| 7,450,127 B2* | 11/2008 | Hong et al. | 345/474 |
| 7,750,592 B2* | 7/2010 | Eguchi | 318/561 |
| 7,792,604 B2* | 9/2010 | Hong et al. | 700/188 |
| 8,190,287 B2* | 5/2012 | Iwashita et al. | 700/182 |
| 2003/0118416 A1 | 6/2003 | Murakami et al. | |
| 2006/0247820 A1* | 11/2006 | Otsuki et al. | 700/189 |
| 2009/0157218 A1* | 6/2009 | Otsuki et al. | 700/188 |
| 2011/0087364 A1* | 4/2011 | Gray | 700/186 |
| 2012/0016514 A1* | 1/2012 | Nakamura et al. | 700/188 |

FOREIGN PATENT DOCUMENTS

| | | |
|---|---|---|
| JP | 2003 108210 | 4/2003 |
| JP | 2006 15431 | 1/2006 |
| JP | 2011 145884 | 7/2011 |

* cited by examiner (a) WHEN CORRECTION IS NOT PERFORMED (b) WHEN CORRECTION IS PERFORMED (WITHOUT SHAPE FEATURE DETERMINATION)

(c) WHEN CORRECTION IS PERFORMED (WITH SHAPE FEATURE DETERMINATION)

TRAJECTORY CONTROL DEVICE

FIELD

The present invention relates to a trajectory control device that manages a tool trajectory, and more particularly to a trajectory control device that limits a trajectory error and realizes high-speed and high-precision machining regardless of a shape of a commanded path, in an NC control device that controls an NC machine tool, an NC laser beam machine, and the like.

BACKGROUND

When machining is performed using a machine such as an NC machine tool or an NC laser beam machine, control is made such that a position of a tool (an edge tool such as an end mill) relative to a workpiece is displaced along a commanded path. This control is referred to as "trajectory control" and is generally performed by executing servo control so that an actual position of each movable axis of the machine follows a position command of each movable axis obtained from the commanded path.

As a problem in executing the trajectory control, there has conventionally been a point where an actual trajectory deviates from the commanded path due to a response delay of a control system of each movable axis. Usually, because control is executed for each movable axis of the machine, each movable axis makes movement with a servo system response thereof being delayed with respect to a position command due to an error resulting from the response delay of the control system of each axis. When a moving direction of the commanded path does not change as in a straight line, even if each axis makes movement with a delay, a trajectory of the servo-system response does not deviate from the commanded path. That is, although an error appears in a tangential direction of the commanded path, an error does not appear in a normal direction of the commanded path. On the other hand, when the moving direction of the commanded path changes as in a curved line or a corner shape, an error appears in the normal direction of the commanded path due to a delay of the servo control system of each axis.

In the following explanations, among errors with respect to the position command of a position of the servo system response, a component in the tangential direction of the commanded path is referred to as "following error", and a component in the normal direction of the commanded path is referred to as "trajectory error". Generally, if there is a trajectory error, a machined shape does not match with an intended shape, and so this situation is not preferable. Meanwhile, the following error does not directly affect the machined shape, and thus the following error may be frequently allowable, but if the following error is excessive, then the machining time increases, and so this situation is not preferable.

As means for limiting these trajectory errors and following errors, for example, Patent Literature 1 discloses a method in which in control of a hand position of a robot, a hand position after a predetermined sampling time is estimated, and a position command is corrected by a value of a normal vector drawn from the estimated hand position to a target trajectory, so that the hand position is maintained on the target trajectory and a trajectory error is limited while allowing a time delay. That is, among errors occurring at the time of executing control of a plurality of movable axes, the trajectory error, which is an error in a direction perpendicular to the target trajectory, namely a commanded path, is estimated, and the commanded path is corrected in an opposite direction by the amount of the estimated trajectory error, so as to correct the trajectory error, thereby limiting the trajectory error possibly occurring in a moving path.

CITATION LIST

Patent Literature

Japanese Patent Application Laid-open No. 2006-015431

SUMMARY

Technical Problem

According to the method as disclosed in Patent Literature 1, when the same amount of a trajectory error occurs constantly as in a simple circle or an arc, the trajectory error can be corrected effectively. However, in a case of a commanded path changed from a straight line to an arc, the trajectory error can not be sufficiently corrected in a boundary portion thereof, and the trajectory error remains even in the corrected moving path. That is, because a trajectory error does not occur in a linear portion, a correction amount for correcting the trajectory error is not generated. However, as described above, in a curved portion such as the arc, an error in the normal direction of the commanded path, that is, a trajectory error occurs, and thus a correction amount for correcting the trajectory error is generated. In the boundary portion between the linear portion and the arc portion, the magnitude and orientation of the trajectory error change transitionally. As a result, the correction amount for correcting the trajectory error also changes transitionally. In such a case, if the estimated trajectory error is directly used to correct the commanded path, then the correction amount in the boundary portion becomes different from an ideal correction amount, so that the trajectory error can not be corrected sufficiently.

For example, there is considered a case where a tool moves along a commanded path on an X-Y plane and after the tool moves linearly in an X-axis direction, an arc command is set. In this case, it is assumed that the straight line and a tangent to an entrance of the arc match each other in orientation, and in the arc portion, the tool moves in a positive direction on a Y-axis. In this case, to correct a trajectory error possibly occurring in the arc portion, a correction amount is added in a direction perpendicular to the commanded path, and the corrected commanded path becomes a path whose arc portion bulges to outside. In such a case, after a certain period of time has passed since changing to the arc command, the corrected path matches the commanded path. However, immediately after changing to the arc command, the corrected moving path overshoots the commanded path, and becomes bulged to outside. That is, immediately after changing to the arc command, the tool once moves in a negative direction on the Y-axis, and then moves in the positive direction on the same. This is because the arc portion of the commanded path bulges to outside in order to correct the command in the direction perpendicular to the commanded path, and at that time, a Y-axis component of the corrected commanded path is once shifted in the negative direction, and then shifted in the positive direction.

In the machine tool, the shape of the moving path of the tool (the edge tool) is transferred to a machined surface. Therefore, as in the above example, if the moving path bulges to outside in a portion at which the trajectories of the straight line and the arc are smoothly connected originally in the boundary therebetween, then the influence of such bulge appears as machining defects such as protrusions or parallel grooves, thereby unfavorably degrading the quality of the machined surface.

The present invention has been achieved in view of the above circumstances, and an object of the present invention is to provide a trajectory control device that can, even if a commanded path is given to make sequence of a straight line and a curved line, perform correction to sufficiently limit a trajectory error in any location including a portion where the magnitude and direction of the trajectory error transitionally change, such as a boundary portion between the straight line and the curved line.

Solution to Problem

In order to solve the above-mentioned problems and achieve the object, the present invention provides a trajectory control device in which a movable portion of a machine is driven by a plurality of movable axes, and a trajectory of the movable portion is controlled by simultaneously controlling motors of the movable axes, the trajectory control device comprising: a servo-system response-trajectory calculation unit that computes a servo-system response trajectory based on a position command of each movable axis; a shape-feature determination unit that determines whether a shape of a commanded path is a straight line or a curved line based on the position command and outputs, as a feature amount of the shape of the commanded path, a shape feature amount; including a boundary point position of the shape of the commanded path and a running direction of the shape near the boundary point; a position-vector correction unit that corrects a position command by performing vector computations based on the position command, the servo-system response trajectory and the shape feature amount, and outputs a corrected position command; and a plurality of servo control units that control a motor of each movable axis by outputting a motor drive torque so that a position of each movable axis follows the corrected position command.

Advantageous Effects of Invention

According to the present invention, even if the magnitude and direction of a trajectory error transitionally change in a boundary portion or inflection point between a straight line and a curved line, or the like in a commanded path in which a straight line and a curved line appear continuously, the trajectory error can be limited effectively, thereby improving trajectory precision. As a result, machining defects such as flaws and parallel grooves on a machined surface can be avoided, thereby leading to advantageous effect of improving the quality of the machined surface.

DESCRIPTION OF EMBODIMENTS

First Embodiment

Figure 1:
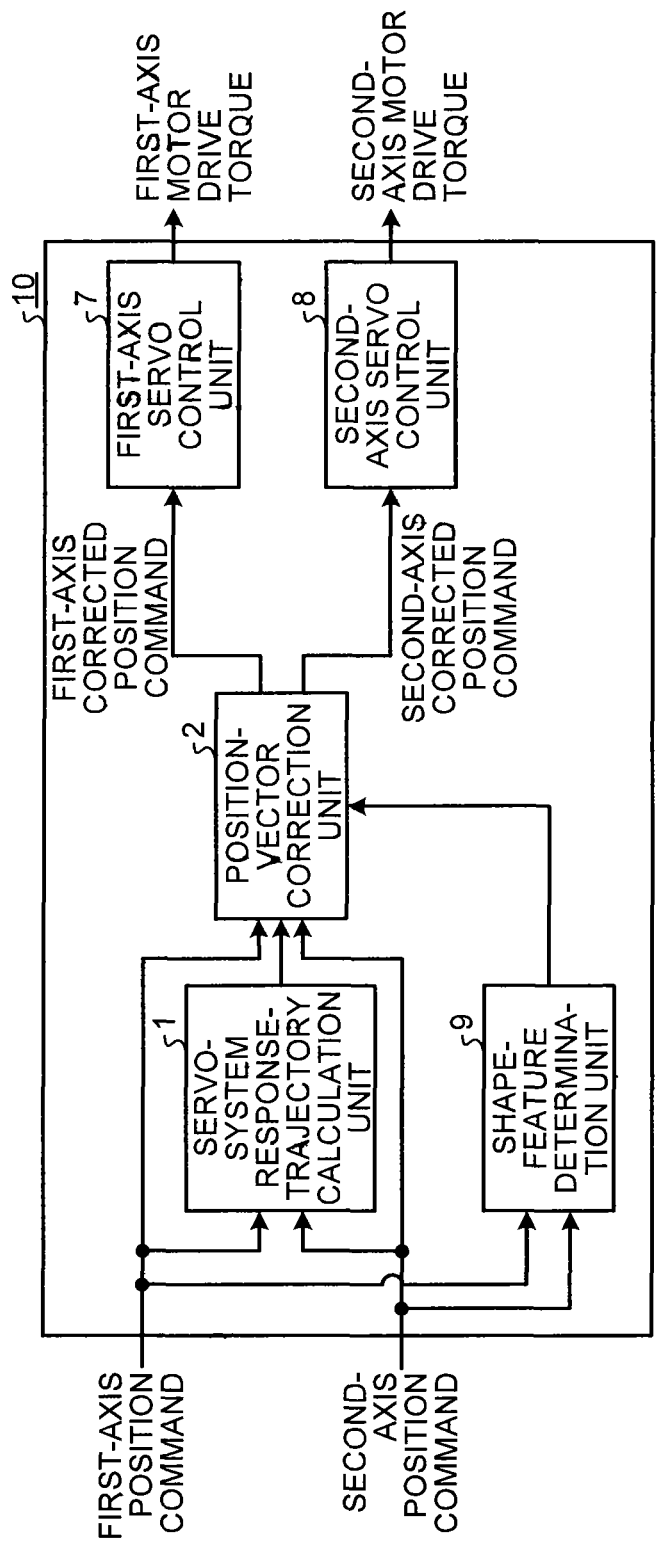
FIG. 1 is a block diagram showing a trajectory control device according to a first embodiment of the present invention.

FIG. 1 is a block diagram of a trajectory control device according to a first embodiment of the present invention. A trajectory control device 10 is configured to include a servo-system response-trajectory calculation unit 1, a shape-feature determination unit 9, a position-vector correction unit 2, a first-axis servo control unit 7 and a second-axis servo control unit 8. A commanded path of a tool (an edge tool) is provided as a first-axis position command and a second-axis position command of a machine in a format of an NC program or the like. In the servo-system response-trajectory calculation unit 1, when the first-axis position command and the second-axis position command are provided, a servo-system response trajectory is calculated. A calculation method of the response trajectory is described later. The shape-feature determination unit 9 determines whether the commanded path determined based on the first-axis and second-axis position commands is a straight line or a curved line, and outputs a boundary point position between the straight line and the curved line and a direction of the straight line as a shape feature amount. The position-vector correction unit 2 calculates a trajectory error based on the servo-system response trajectory and the position commands, and computes a corrected position command for limiting a trajectory error with occurrence of any overshoot of the trajectory being avoided using the calculated trajectory error and the shape feature amount. The correction is performed by synthesizing the first-axis position command and the second-axis position command into a commanded position vector, and performing vector computations on the commanded position vector for the correction, by which axial components of a position vector that is the corrected result are used as the first-axis and second-axis corrected position commands, respectively. The first-axis servo control unit 7 and the second-axis servo control unit 8 output a first-axis motor drive torque and a second-axis motor drive torque, respectively so that the position on the first movable axis and the position on the second movable axis follow the first-axis corrected position command and the second-axis corrected position command, respectively.

Figure 2:
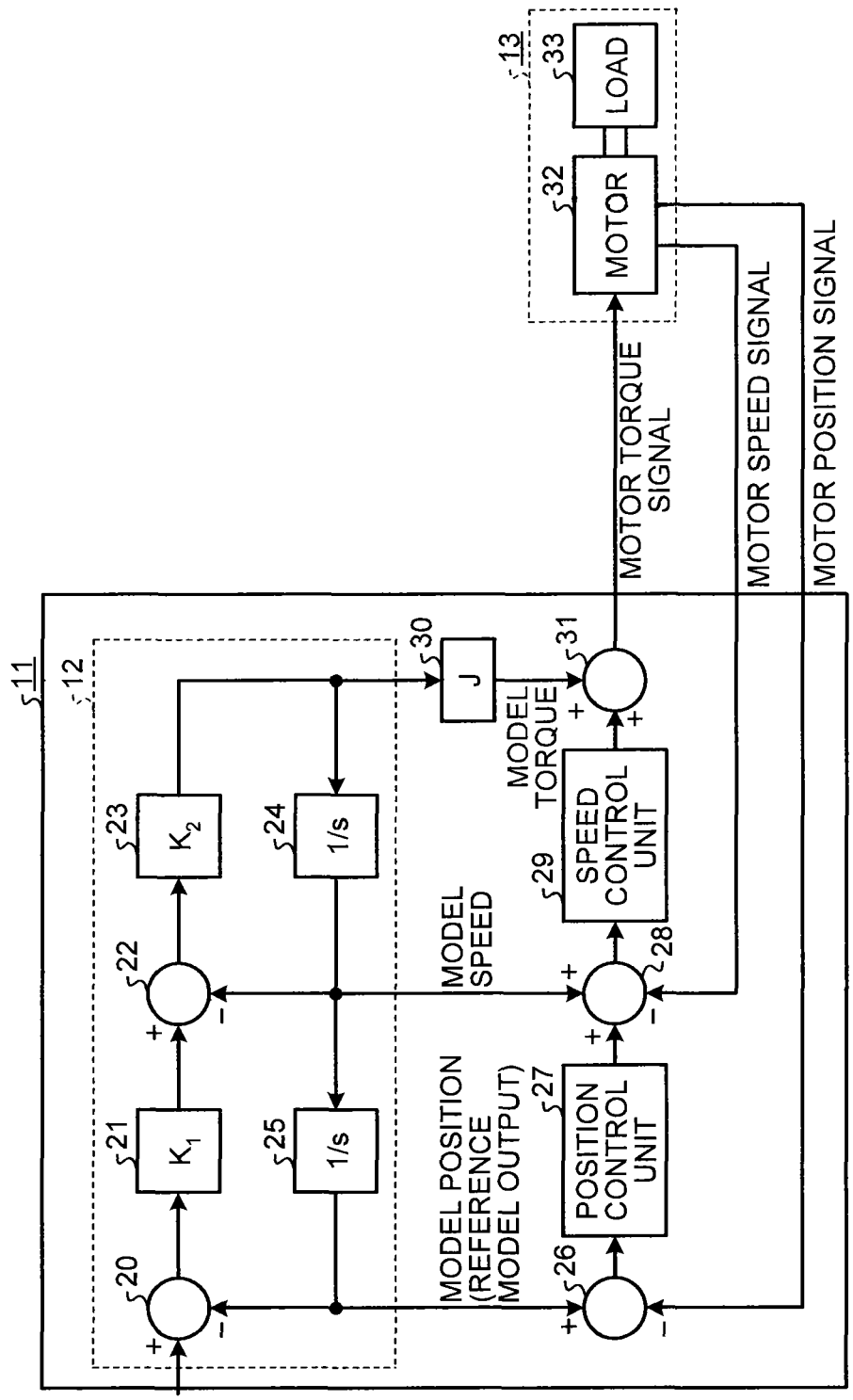
FIG. 2 is a block diagram depicting details of a configuration of a servo control unit shown in FIG. 1.

The first-axis servo control unit 7 and the second-axis servo control unit 8 have the same configuration, and a block diagram thereof is shown in FIG. 2 as a servo control unit 11. A model position is subtracted from the corrected position command inputted to the servo control unit 11 by a subtractor 20, and the subtraction result is then multiplied by a first model gain $K_1$ by a model gain multiplier 21. A model speed is then subtracted from the multiplication result by a subtractor 22, and the subtraction result is then multiplied by a second model gain $K_2$ by a model gain multiplier 23 to output a model acceleration. The model acceleration is integrated by an integrator 24 to output a model speed, and the model speed is integrated by an integrator 25 to output a model position.

Now, a block to which the corrected position command is inputted, and from which the model position, the model speed and the model acceleration are outputted is referred to as "reference model unit 12". A subtractor 26 subtracts a motor position signal from the model position and outputs a position error. A position control unit 27 executes control such as proportional control with respect to the position error. An adder-subtractor 28 adds the model speed to an output of the position control unit, and subtracts a motor speed signal from the output to output a speed error. A speed control unit 29 executes control such as proportional control or integral control with respect to the speed error. A multiplier 30 multiplies the model acceleration by a value corresponding to inertia of a controlled object to compute a model torque. An adder 31 adds the model torque to an output of the speed control unit to output a motor torque signal. A mechanical system 13 including a motor 32 and a load 33 is driven by the motor torque signal, and the motor speed signal and the motor position signal are outputted to the servo control unit 11 as feedback signals.

The servo control unit 11 according to the present embodiment is a two-degree-of-freedom controller using the reference model unit 12, and can be designed with its followability to the command and responsiveness to disturbance being made independent. The followability of the motor position to the position command is determined by the first model gain $K_1$ and the second model gain $K_2$, and the responsiveness of the motor position to disturbance is determined by the design of the position control unit and the speed control unit. Therefore, a response of the motor position is controlled to follow the model position, that is an output of the reference model, regardless of actual characteristics of the controlled object.

Computation of the servo-system response trajectory in the servo-system response-trajectory calculation unit 1 is performed in the following manner. As described above, because the servo system response can be expressed by a response of the reference model, positions of the first-axis and second-axis servo system responses are each obtained by obtaining a model position, that is an output of the reference model, when the first-axis and the second-axis position commands are provided as the inputs. A vector having the positions of the first-axis and second-axis servo system responses as components in the directions of the movable axes, respectively, is set as a servo-system response position vector, and a trajectory drawn by the position vector is set as the servo-system response trajectory. The model position, that is the output of the reference model, can be obtained by expressing the reference model unit 12 shown in FIG. 2 in a form including a differential equation, a difference equation, a transfer function and/or the like, and calculating a solution thereof by a numerical calculation. Furthermore, when a commanded shape is known, an analytical solution can be obtained by an integral calculation.

For example, a transfer function $G_m(s)$ of the reference model shown in FIG. 2 is expressed by the following equation.

$$G_m(s) = \frac{K_1 K_2}{s^2 + K_2 s + K_1 K_2} \quad (1)$$

An output when a certain input is provided to the reference model is obtained by performing inverse Laplace transform of the product of the transfer function of the reference model and a Laplace transform of the provided input. When the first-axis and second-axis position commands are provided as $x_{c1}(t)$ and $x_{c2}(t)$ in a time t, respectively, the position command vector is expressed by the following equation.

$$x_c(t) = \begin{bmatrix} x_{c1}(t) \\ x_{C2}(t) \end{bmatrix} \quad (2)$$

At this point, servo system response positions $x_{r1}(t)$ and $x_{r2}(t)$ of the first-axis and second-axis are expressed by the following equation.

$$x_r(t) = \begin{bmatrix} r_{r1}(t) \\ x_{r2}(t) \end{bmatrix} = \begin{bmatrix} L^{-1}[G(s)L[x_{c1}(t)]] \\ L^{-1}[G(s)L[x_{c2}(t)]] \end{bmatrix} \quad (3)$$

In this equation, L[f(t)] denotes a Laplace transform of f(t), and $L^{-1}[F(s)]$ denotes an inverse Laplace transform of F(s).

Further, a response delay time of the servo system can be obtained from the transfer function of the reference model. Herein, a constantly-caused delay time of the response to the command when an input for a constant speed is provided to the servo system is set as a servo-system response delay time. In the reference model unit 12 shown in FIG. 2, a servo-system response delay time $t_d$ is an inverse of the first model gain and expressed by the following equation.

$$t_d = \frac{1}{K_1} \quad (4)$$

Figure 3:
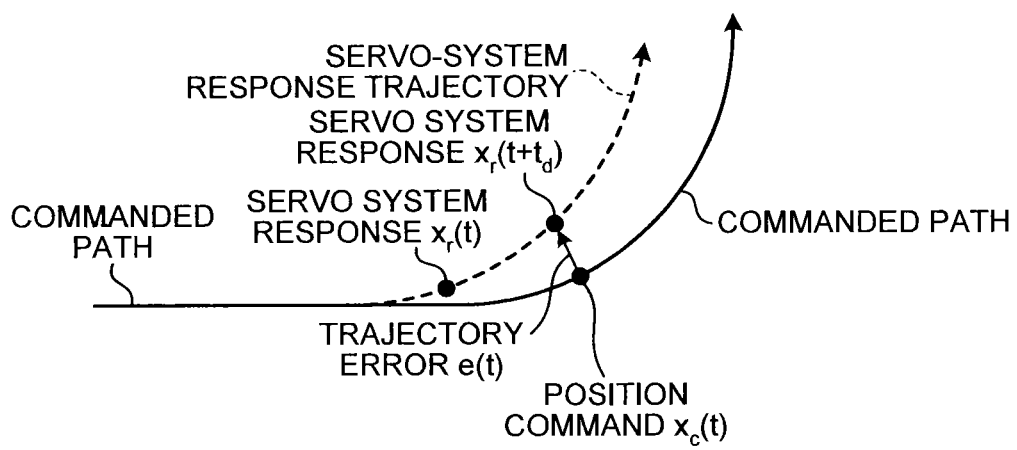
FIG. 3 is an illustration showing a computing operation of a trajectory error vector in the first embodiment.

FIG. 3 is an explanatory illustration of an operation of a calculation part of the trajectory error, among the position-vector correction unit 2 in the first embodiment. There is described the case where the commanded path is a path in which a straight line and an arc are continuously connected. In this case, the servo-system response trajectory takes a path as shown by a broken line in FIG. 3, and takes a position $x_r(t)$ at the time t. In the operation for estimating the trajectory error, to remove an influence of the following error due to a response delay of the servo system, a difference between the position command and a servo system response position advanced by the servo-system response delay time is obtained, not a subtraction of the servo system response position at the same time and the position command, whereby the difference is set as an estimate value of the trajectory error. Therefore, a trajectory error e(t) is expressed by the following equation.

$$e(t) = x_r(t+t_d) - x_c(t) \quad (5)$$

When correction of the position command is collectively performed for all times, a servo system response position at a position advanced by the servo-system response delay time is easily obtained. However, when correction of the position command is performed by sequentially processing momentary position commands, a position command needs to be forecasted for the servo-system response delay time.

Figure 4:
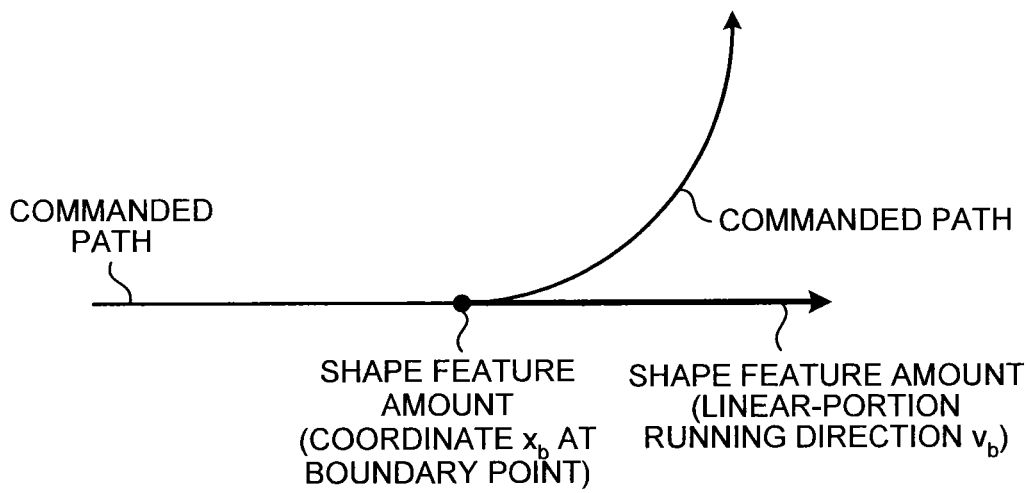
FIG. 4 is an illustration showing an operation of a shape-feature determination unit in the first embodiment.

FIG. 4 is an explanatory illustration of an operation of the shape-feature determination unit 9. Here is the case where the commanded path is a path in which a straight line and an arc are continuously connected. The shape-feature determination unit 9 determines whether the commanded path is a straight line or a curved line. When the commanded path changes from a straight line to a curved line, the shape-feature determination unit 9 outputs a position coordinate value at a boundary point therebetween as a shape feature amount (the boundary point coordinate), and also outputs a running direction of the linear portion as another shape feature amount (a linear-portion running direction). That is, in this case, that is the case where the command path changes from a straight line to an arc, a coordinate $x_b$ at a joint (a boundary point) between the straight line and the arc and a running direction $v_b$ in the linear portion immediately before the joint are outputted as the shape feature amounts.

Determination as to whether the commanded path is a curved line or a straight line and determination of a boundary point can be performed by several methods described below, and any one of these methods may be used. That is, they include: (1) a method in which it is checked whether or not a curvature of the commanded path is 0 (zero), the commanded path is determined to be a straight line if the curvature is 0 (zero), or a curved line if the curvature is not 0 (zero), and a point at which the curvature changes from 0 (zero) to a non-zero value is designated as a boundary point; (2) a method in which it is checked whether or not acceleration in the normal direction of the commanded path (a length of a vector obtained by projecting an acceleration vector obtained by differentiating momentary position commanded vectors twice with respect to time, in the normal direction of the commanded path) is 0 (zero), the commanded path is determined to be a straight line if the acceleration is 0 (zero) or a curved line if not, and a point at which the length of the acceleration vector changes from 0 to a non-zero value is designated as the boundary point; and (3) a method in which an NC program is analyzed to extract a boundary between a linear command (such as a G1 command in an EIA code generally used in NC control) and a curve command (such as a G2 command or a G3 command in the EIA code), and a connection point at the time of changing from the linear command to the curve command is designated as the boundary point. In these methods, when it is determined whether or not a value is 0 (zero), determination as to whether or not a value is equal to or lower than a predetermined threshold can be used instead of the determination as to whether the value is 0 (zero), in order to avoid an effect of rounding errors in numerical operation.

Figure 5:
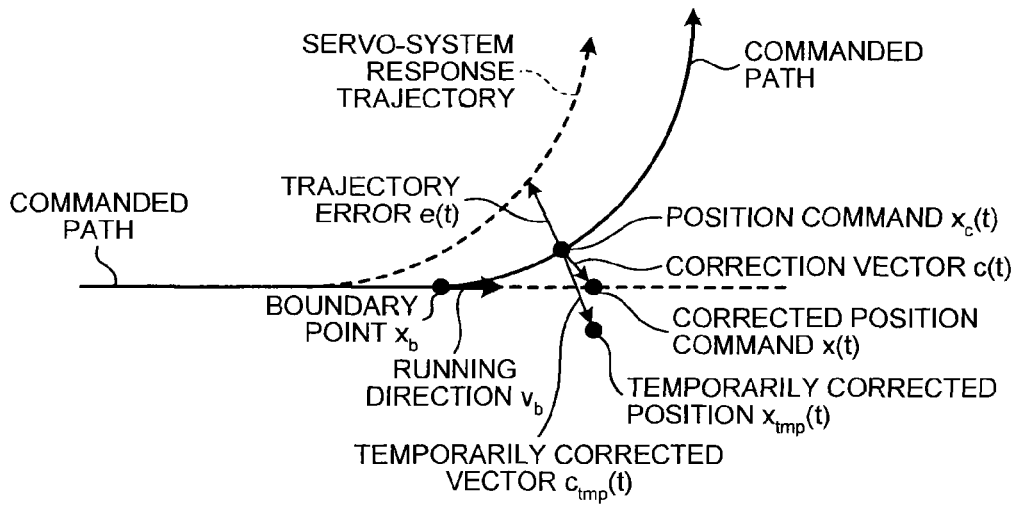
FIG. 5 is an illustration showing a computing operation of a corrected position command in the first embodiment.

FIG. 5 is an explanatory illustration of an operation of a portion that computes a corrected position command based on the shape feature amounts, the position command and the trajectory error, of the position-vector correction unit 2. First, the trajectory error e(t) is multiplied by a correction gain α and a sign thereof is inverted to obtain a temporarily corrected vector $c_{tmp}(t)$.

$$c_{tmp}(t) = -\alpha e(t) \quad (6)$$

The correction gain α is usually set between 0 and 1, and as the correction gain α is set to a value closer to 1, the trajectory error can be smaller. Preferably, setting the correction gain α to 1 causes the position command to be corrected so as to negate an error vector in the normal direction, thereby enabling to limit the trajectory error effectively.

The corrected position command x(t) is then computed based on the relation among the position command, the temporarily corrected vector and the shape feature amounts. A position obtained after the temporarily corrected vector $c_{tmp}(t)$ is added to a position command $x_c(t)$ is designated as a temporarily corrected position $x_{tmp}(t)$. In this, in a plane including the corrected vector commanded path, a straight line passing through the boundary point $x_b$ and having the same direction as the running direction $v_b$ is defined as a reference straight line. If the position command $x_c(t)$ and the temporarily corrected position $x_{tmp}(t)$ are in a positional relation with them being opposite to each other with respect to the reference straight line, then a position obtained by shifting the temporarily corrected position $x_{tmp}(t)$ onto the reference straight line is designated as the corrected position command x(t), so that the position command and the corrected position command are not in the positional relation with them being opposite to each other with respect to the reference straight line. On the other hand, if the position command $x_c(t)$ and the temporarily corrected position $x_{tmp}(t)$ are not in a positional relation with them being opposite to each other with respect to the reference straight line, then the temporarily corrected position $x_{tmp}(t)$ is designated as the corrected position command x(t) as it is.

A series of computations for obtaining the corrected position command x(t) is expressed by equations as follows. First, the position command $x_c(t)$ and the temporarily corrected position $x_{tmp}(t)$ are converted to vectors starting from the boundary point $x_b$, and the obtained ones are designated as $x_c'(t)$, $x_{tmp}'(t)$.

$$x_c'(t) = x_c(t) - x_b \quad (7)$$

$$x_{tmp}'(t) = x_{tmp}(t) - x_b \quad (8)$$

Next, a vector passing through the boundary point $x_b$ and perpendicular to the reference straight line is obtained as a reference normal vector $n_b$. In this, the direction of the reference normal vector is set so that the inner product of the reference normal vector $n_b$ and a difference $x_c'$ between the position command and the boundary point position becomes positive. Furthermore, the length of the reference normal vector is normalized to be 1 (one).

$$n_b' = x_c'(t) - v_b \cdot x_c'(t)$$

$$n_b = n_b'/|n_b'| \quad (9)$$

The inner product of the vector $x_{tmp}'(t)$ from the boundary point $x_b$ to the temporarily corrected position $x_{tmp}(t)$ and the reference normal vector $n_b$ is then obtained, and when a value of the inner product is negative, the temporarily corrected position $x_{tmp}(t)$ is corrected from the boundary point $x_b$ as described below, thereby to obtain the corrected position x(t).

$$x(t) = x_{tmp}(t) - (n_b \cdot x_{tmp}'(t)) n_b \quad (10)$$

On the other hand, when the inner product of the vector $x_{tmp}'(t)$ from the boundary point $x_b$ to the temporarily corrected position and the reference normal vector $n_b$ is equal to or larger than 0 (zero), the temporarily corrected position $x_{tmp}(t)$ is designated as the corrected position x(t) as it is. When the inner product of a vector from the boundary point position to the corrected position command obtained by the equation (10) and the reference normal vector is taken, it becomes 0 as shown by the following equation.

$$(x(t) - x_b) \cdot n_b = (x_{tmp}'(t) - (n_b \cdot x_{tmp}'(t)) n_b) \cdot n_b = x_{tmp}'(t) \cdot n_b - n_b \cdot x_{tmp}'(t) = 0 \quad (11)$$

That is, it can be understood that the corrected position command obtained by the equation (10) is on the reference straight line.

In the present embodiment, there are two movable axes. Therefore, a first element $x_1(t)$ and a second element $x_2(t)$ of the corrected position x(t) become corrected position commands of the first axis and the second axis, respectively. In the first-axis servo control unit 7 (11) and the second-axis servo control unit 8 (11), the first-axis and second-axis motors are driven based on the servo control unit 11 shown in FIG. 2, responding to the corrected position commands $x_1(t)$ and $x_2(t)$, respectively, thereby controlling the position of the movable part of the machine.

Figure 6:
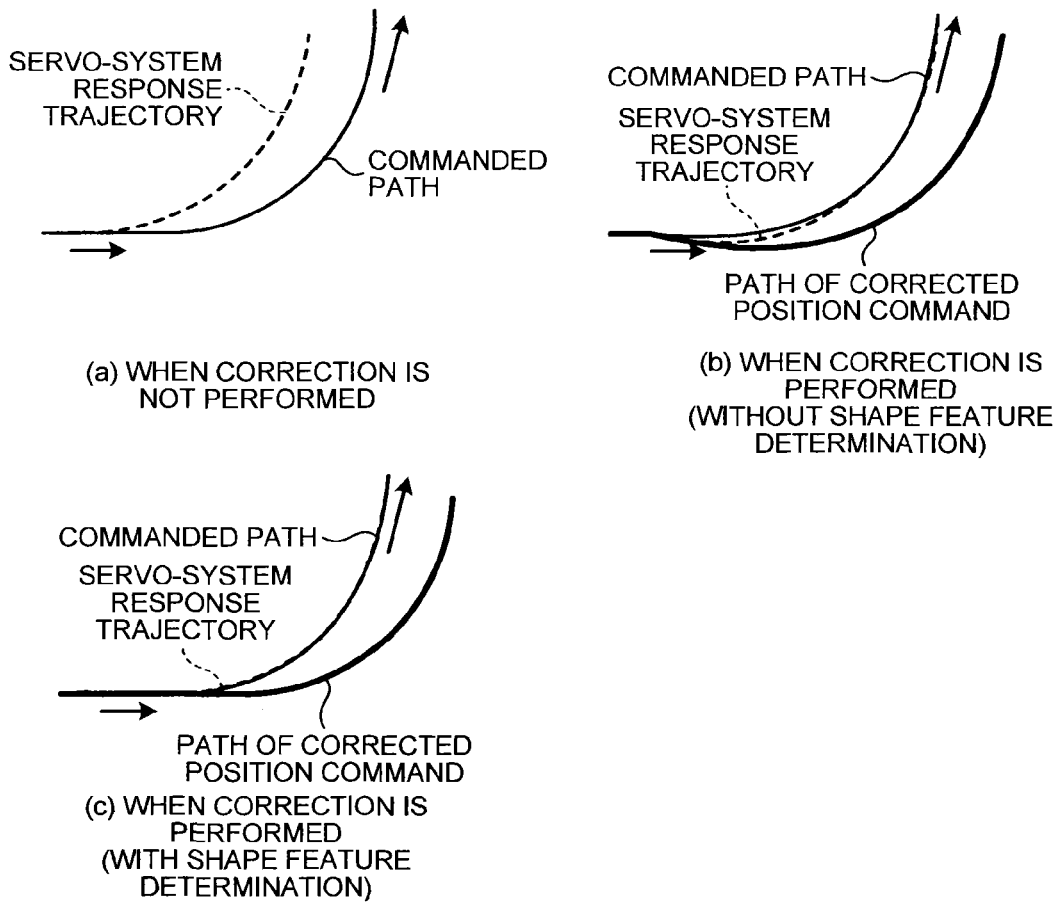
FIG. 6 has figures showing effects of correction (trajectory-error limitation) in the first embodiment.

FIG. 6 has illustrations showing a trajectory-error limitation effect when trajectory control is executed according to the present embodiment. In FIG. 6, (a) depicts a trajectory when correction of the position vector is not performed (when a position command is directly inputted to the servo control unit), (b) depicts a trajectory when correction of the position vector is performed but a shape feature determination is not performed, that is, when the temporarily corrected position $x_{tmp}(t)$ described above is directly used as the corrected position command at all times, and (c) depicts a trajectory when correction of the position vector is performed and the shape feature determination is also performed, where a thin solid line denotes a commanded path, a thick solid line denotes a path of the corrected position command, and a broken line denotes a servo-system response trajectory. The commanded path changes from a straight line to an arc. When correction of the position vector is not performed in (a), the servo-system response trajectory is a path turning inward in an arc part due to a response delay of the servo system, and a trajectory error occurs inside thereof. When correction of the position vector is performed but the shape feature determination is not performed in (b), the corrected position command bulges to outside, and as a result, the trajectory error becomes substantially 0 (zero) some time after the position command changes from the straight line to the arc. However, near a joint (a boundary point) between the straight line and the arc, the servo-system response trajectory bulges to outside due to an influence of the corrected position command bulging to outside, thereby causing a trajectory error. Meanwhile, when correction of the position vector and a shape feature determination are both performed in (c), because the corrected position command is produced so as not to overrun outside from a straight line passing through the boundary point and having the same direction as the running direction of the linear portion, any bulge of the servo-system response trajectory near the boundary point does not occur, thereby enabling to limit the trajectory error.

As described above, according to the first embodiment, the corrected position is computed based on the shape feature amount outputted from the shape-feature determination unit that determines whether the commanded path is a straight line or a curved line. Therefore, even if the magnitude and direction of the trajectory error change transitionally in a boundary portion or inflection point between a straight line and a curved line, for example, in a commanded shape having a straight line and a curved line that are connected continuously, the trajectory error can be effectively limited, thereby improving trajectory precision. As a result, machining defects such as flaws and parallel grooves on the machined surface can be avoided, thereby improving the quality of the machined surface.

Furthermore, according to the first embodiment, a position obtained by adding a correction vector obtained by multiplying a difference between the servo-system response trajectory and the position command by the correction gain to the position command is designated as a temporarily corrected position, and further, a corrected position vector is computed based on the positional relation among the position command, the temporarily corrected position and the shape feature amounts, to output each axial component of the position vector as the corrected position command, thereby enabling to limit the trajectory error regardless of the commanded shape and the servo system response.

Further, according to the first embodiment, a portion in which the position command trajectory changes from a straight line to a curved line is extracted, and a position of the boundary point thereof and a running direction immediately before the boundary point are outputted as the shape feature amounts. When the position command and the temporarily corrected position become opposite to each other with respect to the reference straight line, which is determined by the running direction immediately before the boundary point, near the boundary point, the position-vector correction unit designates a position obtained by shifting the temporarily corrected position onto the reference straight line as the corrected position command, so as to compute the corrected position vector so that a position command before correction and a corrected position command do not have a positional relation with them being opposite to each other with respect to the reference straight line. Accordingly, a trajectory error in a portion transiting from a straight line to a curved line can be limited.

Furthermore, according to the first embodiment, by using a two-degree-of-freedom controller using a reference model for the servo control unit, a response of the servo control unit can be accurately calculated from the response of the reference model, regardless of the characteristics of a control target. Further, by obtaining a response trajectory using the reference model to correct the position command, a trajectory error caused due to the responsiveness of the servo control unit can be accurately corrected.

In the first embodiment, although the number of the movable axes is two, the number of the movable axes may be three or more. Similar correction can be performed by using a three or more dimensional vector, instead of a two-dimensional vector for the vector of the servo-system response trajectory, the error vector, and the correction vector.

Second Embodiment

The configuration of a second embodiment is substantially the same as that of the first embodiment, and thus the configuration of the second embodiment is equivalently shown in FIG. 1. Features of the second embodiment different from the first embodiment are a reference point and a determination system of the correction vector in a correction-vector computation unit 3. These different features are explained below.

Figure 7:
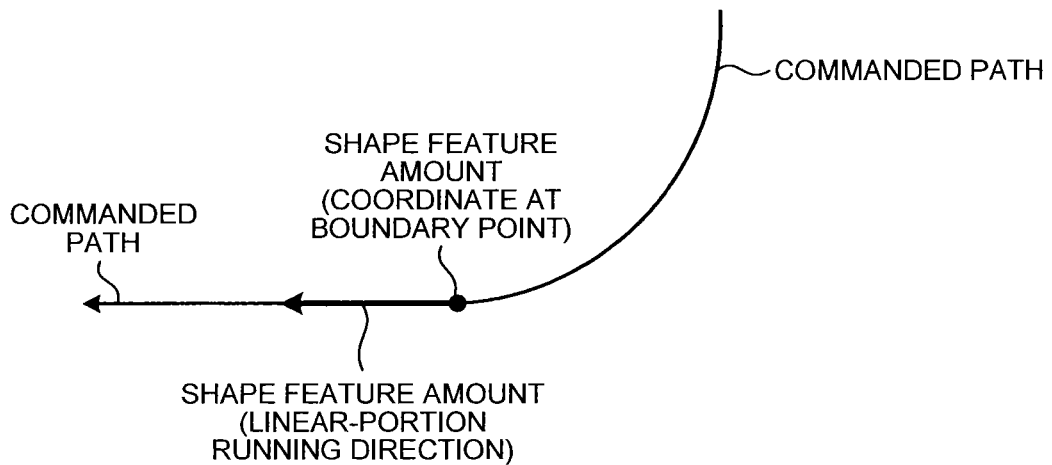
FIG. 7 is an illustration showing an operation of a shape-feature determination unit in a second embodiment.

Operations of the servo-system response-trajectory calculation unit 1 according to the second embodiment are identical to those of the first embodiment. Of the operations of the position-vector correction unit 2, a computing part of the trajectory error is identical to that in the first embodiment. FIG. 7 depicts an operation of the shape-feature determination unit 9 according to the second embodiment. In the present embodiment, there is assumed the case of transition from an arc to a straight line. Therefore, a coordinate value at a joint (a boundary point) between the arc and the straight line is outputted as a shape feature amount (coordinate of the boundary point), and a running direction of a linear portion after passing through the boundary point is outputted as another shape feature amount (the linear-portion running direction).

Determination as to whether the commanded path is the curved line or the straight line and determination of the boundary point may be performed by several methods described below, and any of them can be used. That is, they include: (1) a method in which it is checked whether or not a curvature of the commanded path is 0 (zero), the commanded path is determined to be a straight line if the curvature is 0 (zero), or to be a curved line if not, and a point at which the curvature changes from a non-zero value to zero is designated as a boundary point; (2) a method in which it is checked whether or not acceleration in the normal direction of the commanded path (a length of a vector obtained by projecting an acceleration vector obtained by differentiating momentary position command vectors twice with respect to time in the normal direction of the commanded path) is 0 (zero), the commanded path is determined to be a straight line if the acceleration is 0 (zero) or a curved line if not, and a point at which the length of the acceleration vector changes from a non-zero value to zero is designated as the boundary point; and (3) a method in which an NC program is analyzed to extract a boundary between a linear command (such as a G1 command in the EIA code generally used in NC control) and a curve command (such as a G2 command or a G3 command in the EIA code), and a connection point at which the curve command is changed to the linear command is designated as the boundary point. In these methods, when it is determined whether or not a value is 0 (zero), to avoid an effect of rounding errors in an arithmetic computation, determination as to whether a value is equal to or lower than a predetermined threshold may be used instead of the determination as to whether a value is 0.

Figure 8:
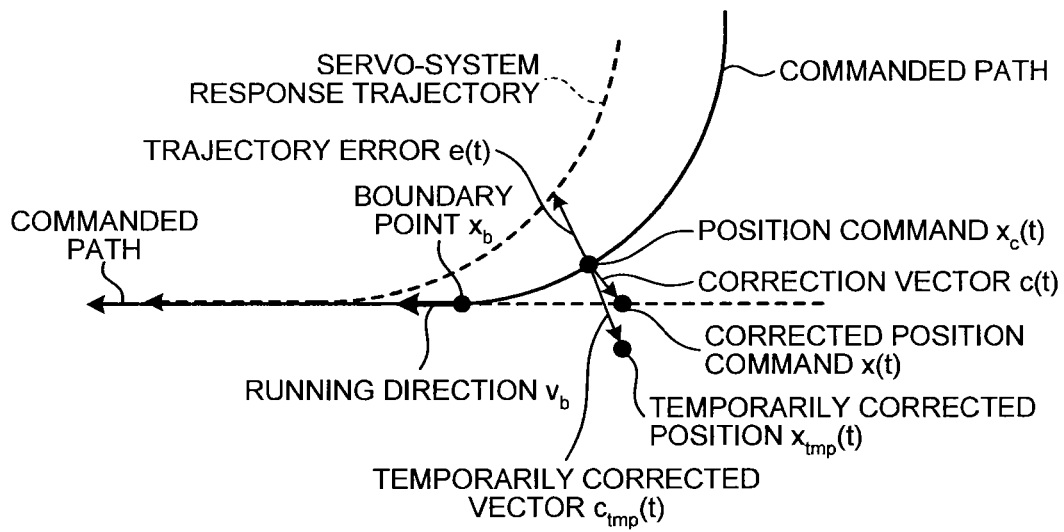
FIG. 8 is an illustration showing a computing operation of a corrected position command in the second embodiment.

FIG. 8 is an explanatory illustration of an operation of a part that computes a corrected position command based on the shape feature amounts, the position command and the trajectory error, of the position-vector correction unit 2 in the second embodiment of the present invention. A procedure for computing the corrected position command is identical to that in the first embodiment; however, in the present embodiment, there is assumed an operation when the commanded path changes from an arc to a straight line. Therefore, a temporarily corrected vector $c_{tmp}(t)$ is computed using the equation (6) from the trajectory error in an arc portion before the boundary point, and a corrected position command $x(t)$ is computed based on a positional relation among the temporarily corrected vector, the boundary point coordinate $x_b$, and the running direction $v_b$. At the time of obtaining a corrected position, a reference normal vector is computed using the equation (9), and the inner product of the vector $x_{tmp}'(t)$ from the boundary point $x_b$ to the temporarily corrected position $x_{tmp}(t)$ and the reference normal vector $n_b$. When the value of the inner product is negative, the temporarily corrected position $x_{tmp}(t)$ is corrected using the equation (10), thereby to obtain the corrected position $x(t)$. On the other hand, when the inner product of the vector $x_{tmp}'(t)$ from the boundary point $x_b$ to the temporarily corrected position and the reference normal vector $n_b$ is equal to or larger than 0 (zero), the temporarily corrected position $x_{tmp}(t)$ is directly used as the corrected position $x(t)$. Operations of the first-axis servo control unit 7 and the second-axis servo control unit 8 are identical to those in the first embodiment.

As described above, according to the second embodiment, the corrected position is computed based on the shape feature amounts outputted from the shape-feature determination unit that determines whether the commanded path is a straight line or a curved line. Therefore, even if the magnitude and direction of the trajectory error change transitionally in a boundary portion or inflection point between a straight line and a curved line, for example, in a commanded shape in which a straight line and a curved line are continuously connected, the trajectory error can be effectively limited, thereby improving trajectory precision. As a result, machining defects such as flaws and parallel grooves on the machined surface can be avoided, thereby improving the quality of the machined surface.

Furthermore, according to the second embodiment, a position obtained by adding a correction vector obtained by multiplying a difference between the servo-system response trajectory and the position command by the correction gain to the position command is designated as a temporarily corrected position, and further, a corrected position vector is computed based on the positional relation among the position command, the temporarily corrected position, and the shape feature amounts, to output each axial component of the position vector as the corrected position command, thereby enabling to limit the trajectory error regardless of the commanded shape and the servo system response.

Further, according to the second embodiment, a portion in which the position command trajectory changes from a curved line to a straight line is extracted, and the position at the boundary thereof and a running direction immediately before the boundary are outputted as the shape feature amounts. When the position command and the temporarily corrected position become opposite to each other with respect to the reference straight line which is determined by the running direction immediately before the boundary point, near the boundary point, the position-vector correction unit uses a position obtained by shifting the temporarily corrected position onto the reference straight line as a corrected position command, so as to compute the corrected position vector so that a position command before correction and a corrected position command do not have a positional relation with the commands being opposite to each other with respect to the reference straight line. Accordingly, it is possible to reduce a trajectory error at a portion transiting from a curved line to a straight line.

Furthermore, according to the second embodiment, by using a two-degree-of-freedom controller using a reference model for the servo control unit, a response of the servo control unit can be accurately calculated from the response of the reference model, regardless of the characteristics of the controlled object. Further, by obtaining a response trajectory using the reference model to correct the position command, a trajectory error caused due to the responsiveness of the servo control unit can be accurately corrected.

In the second embodiment, although the number of the movable axes is two, the number of the movable axes can be three or more. Similar correction can be performed by using a three or more dimensional vector, instead of a two-dimensional vector for the vector of the servo-system response trajectory, the error vector, and the correction vector.

Third Embodiment

The configuration of a third embodiment is substantially the same as that of the second embodiment, and thus the overall configuration thereof is equivalently shown in FIG. 1. A feature of the third embodiment different from those of the second embodiment is an operation of the servo-system response-trajectory calculation unit. Furthermore, consecutive arc commands whose orientations are different are provided as a shape of the commanded path.

Figure 9:
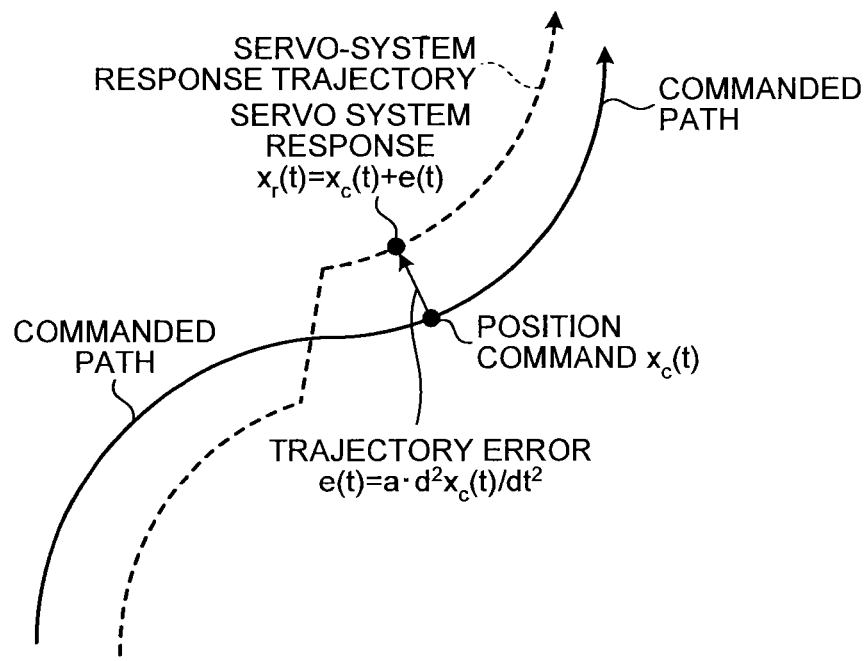
FIG. 9 is an illustration showing an operation of a servo-system response-trajectory calculation unit in a third embodiment.

FIG. 9 is an explanatory illustration of an operation of the servo-system response-trajectory calculation unit 1 in the third embodiment. In the third embodiment, the servo-system response trajectory is obtained not by using the servo system model but by using only the information of the position command. When the commanded shape has a shape smoothly changing such as an arc, a trajectory error tends to appear in an acceleration direction of the commanded path in proportion to the magnitude of an acceleration. A proportionality coefficient thereof is determined based on the responsiveness of the servo system. The position of the servo system response in a time t is obtained by adding an error vector $e(t)$ to the position command in the same time. The trajectory error vector $e(t)$ is obtained by multiplying an acceleration vector $d^2x_c/dt^2$ of the position command by a coefficient "a". The coefficient "a" is set to be proportional to a square of a servo-system response delay time $t_d$. This relational expression is set by a method of obtaining a relation between the command acceleration and a trajectory error amount by actual measurement or a method of analytically obtaining a ratio between a theoretical value of the trajectory error amount at the time of an arc command and the commanded acceleration. In the latter method, the trajectory error amount at the time of the arc command is obtained by subtracting from a commanded radius a value obtained by multiplying an absolute value of a transfer function of a servo-system frequency response by a commanded radius, and the trajectory error amount is divided by the commanded acceleration, thereby obtaining the ratio. This is expressed by the following equation. At the time of the arc command having a radius R and an angular speed $\omega$, a ratio between the trajectory error amount and the commanded acceleration is provided using a transfer function G(s) of the servo system.

$$a = \frac{R(1 - |G(j\omega)|)}{R\omega^2} = \frac{(1 - |G(j\omega)|)}{\omega^2} \quad (12)$$

where j is an imaginary unit.

In the servo control system shown in FIG. 2, the transfer function is expressed by the equation (1), and the servo-system response delay time is expressed by the equation (4). When the second model gain is four times the first model gain, that is, $K_2=4K_1$, if a relation between the trajectory error amount and the servo-system response delay time is obtained using the equation (12), the following equation is held.

$$a = \frac{1}{4}\frac{1}{K_1^2} = \frac{1}{4}t_d^2 \quad (13)$$

Figure 10:
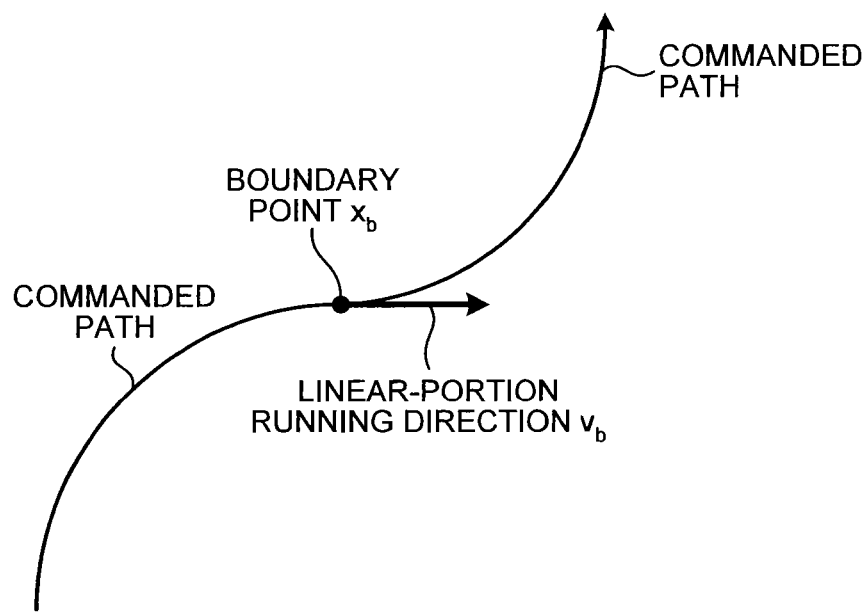
FIG. 10 is an illustration showing an operation of a shape-feature determination unit in the third embodiment.

FIG. 10 depicts an operation of the shape-feature determination unit 9 according to the third embodiment. In the present embodiment, there is assumed an operation when arcs in different directions are continuously commanded. Accordingly, a coordinate value at a joint (a boundary point) between the arcs is outputted as the shape feature amount (coordinate at the boundary point), and a running direction at the boundary point is outputted as another shape feature amount (the linear-portion running direction). In this, the running direction becomes a tangential direction of a curved line at the boundary point. This can be interpreted as a case where a minute straight line part is present between the first arc and the second arc.

Determination of the boundary point may be performed by several methods described below, and any of these methods may be used. That is, they include: (1) a method in which it is checked whether or not a curvature of the commanded path is 0 (zero), the commanded path is determined to be a straight line if the curvature is 0 (zero), or a curved line if not, and it is checked whether a center of curvature is on the right side or the left side when advancing in the traveling direction and a point at which the right-left direction of the center of curvature changes is designated as a boundary point; (2) a method in which it is checked whether or not acceleration in the normal direction of the commanded path (a length of a vector obtained by projecting an acceleration vector obtained by differentiating momentary position command vectors twice with respect to time in the normal direction of the commanded path) is 0 (zero), the commanded path is determined to be a straight line if the acceleration is 0 (zero) or a curved line if not, and further, the outer product of the acceleration vector and a velocity vector is checked and a point at which a sign of the outer product changes is designated as the boundary point; and (3) a method in which an NC program is analyzed to extract a boundary between curve commands having different directions of curving (such as a G2 command and a G3 command in the EIA code generally used in NC control). In these methods, when it is determined whether or not a value is 0 (zero), to avoid an effect of rounding errors in an arithmetic computation, determination as to whether a value is equal to or lower than a predetermined threshold may be used instead of the determination as to whether a value is 0 (zero).

Figure 11:
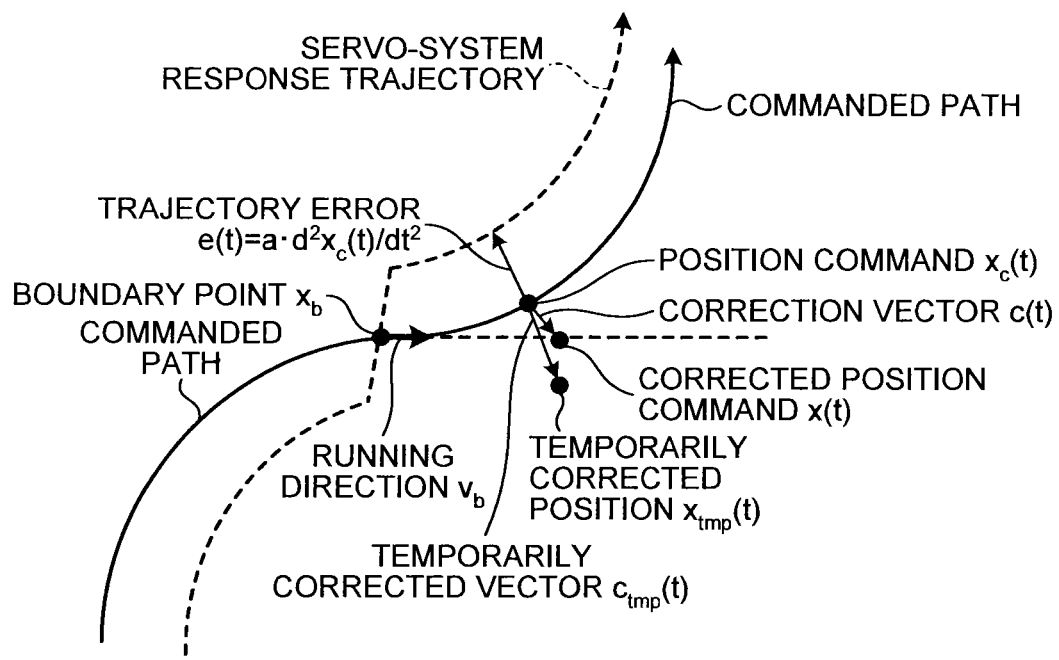
FIG. 11 is an illustration showing a computing operation of a corrected position command in the third embodiment.

FIG. 11 is an explanatory illustration of an operation of a part that computes a corrected position command based on the shape feature amounts, the position command and the trajectory error, of the position-vector correction unit 2 in the third embodiment. A procedure for computing the corrected position command is identical to that in the first embodiment. However, in the present embodiment, there is assumed an operation when the arcs having different directions are continuously commanded. Therefore, a temporarily corrected vector $c_{tmp}(t)$ is computed from the trajectory error using the equation (6), and a corrected position command x(t) is computed based on a positional relation among the temporarily corrected vector, a coordinate $x_b$ at the boundary point and the running direction $v_b$ in each of an arc portion before the boundary point and an arc portion after the boundary point. At the time of obtaining a corrected position, a reference normal vector is computed using the equation (9), and the inner product of the vector $x_{tmp}'(t)$ from the boundary point $x_b$ to the temporarily corrected position $x_{tmp}(t)$ and the reference normal vector $n_b$ is obtained. When the value of the inner product is negative, the temporarily corrected position $x_{tmp}(t)$ is corrected using the equation (10), thereby to obtain the corrected position x(t). On the other hand, when the inner product of the vector $x_{tmp}'(t)$ from the boundary point $x_b$ to the temporarily corrected position and the reference normal vector $n_b$ is equal to or larger than 0 (zero), the temporarily corrected position $x_{tmp}(t)$ is directly used as the corrected position x(t). Operations of the first-axis servo control unit 7 and the second-axis servo control unit 8 are identical to those in the first embodiment.

As described above, according to the third embodiment, the corrected position is computed based on the shape feature amounts outputted from the shape-feature determination unit that determines whether the commanded path is a straight line or a curved line. Therefore, even if the magnitude and direction of the trajectory error change transitionally in a boundary portion or inflection point between a straight line and a curved line, for example, in a commanded shape in which a straight line and a curved line are continuously connected, the trajectory error can be effectively limited, thereby improving trajectory precision. As a result, machining defects such as flaws and parallel grooves on the machined surface can be avoided, thereby improving the quality of the machined surface.

Furthermore, according to the third embodiment, a position obtained by adding a correction vector obtained by multiplying a difference between the servo-system response trajectory and the position command by the correction gain to the position command is designated as a temporarily corrected position, and further, a corrected position vector is computed based on the positional relation among the position command, the temporarily corrected position and the shape feature amounts, to output each axial component of the position vector as the corrected position command, thereby enabling to limit the trajectory error regardless of the commanded shape and the servo system response.

Further, according to the third embodiment, a portion of the inflection point of the position command trajectory, that is, a connection point when arcs having different directions are continuously commanded is extracted, and the position at the boundary thereof and the running direction at the boundary are outputted as the shape feature amounts. When the position command and the temporarily corrected position become opposite to each other with respect to the reference straight line which is determined by the running direction immediately before the boundary point, near the boundary point, the position-vector correction unit designates a position at which the temporarily corrected position is shifted onto the reference straight line as the corrected position command, so as to compute the corrected position vector so that a position command before correction and a corrected position command do not have a positional relation with the commands being opposite to each other with respect to the reference straight line. Accordingly, a trajectory error at a portion of the inflection point of a commanded curve can be limited.

Furthermore, according to the third embodiment, by obtaining a servo-system response trajectory only based on the information of the position command trajectory, without using a model of the servo control unit, a computational load for obtaining the servo-system response trajectory can be reduced.

In the third embodiment, although the number of the movable axes is two, the number of the movable axes may be three or more. Similar correction can be performed by using a three or more dimensional vector, instead of a two-dimensional vector for the vector of the servo-system response trajectory, the error vector and the correction vector.

INDUSTRIAL APPLICABILITY

As described above, the trajectory control device according to the present invention is suitable to be applied for a trajectory control device in which a movable portion of a machine is driven by a plurality of movable axes, and a trajectory of the movable portion is controlled by simultaneously controlling motors of the movable axes.

REFERENCE SIGNS LIST 1 servo-system response-trajectory calculation unit
2 position-vector correction unit
7 first-axis servo control unit
8 second-axis servo control unit
9 shape-feature determination unit
10 trajectory control device
11 servo control unit
12 reference model unit
13 mechanical system
20, 22, 26 subtractor
21, 23 model gain multiplier
24, 25 integrator
31 adder
27 position control unit
28 adder-subtractor
29 speed control unit
30 multiplier
32 motor
33 load

The invention claimed is:

1. A trajectory control device in which a movable portion of a machine is driven by a plurality of movable axes, and a trajectory of the movable portion is controlled by simultaneously controlling motors of the movable axes, the trajectory control device comprising:
    a servo-system response-trajectory calculation unit that computes a servo-system response trajectory based on a position command of each movable axis;
    a shape-feature determination unit that determines whether a shape of a commanded path is a straight line or a curved line based on the position command and outputs, as a feature amount of the shape of the commanded path, a shape feature amount including a boundary point position of the shape of the commanded path and a running direction of the shape near the boundary point;
    a position-vector correction unit that corrects a position command by performing vector computations based on the position command, the servo-system response trajectory and the shape feature amount, and outputs a corrected position command; and
    a plurality of servo control units that control a motor of each movable axis by outputting a motor drive torque so that a position of each movable axis follows the corrected position command.

2. The trajectory control device according to claim 1, wherein the position-vector correction unit designates a position obtained by adding to the position command a correction vector obtained by multiplying a difference between the servo-system response trajectory and the position command by a correction gain, as a temporarily corrected position, and computes a corrected position vector based on a positional relation among the position command, the temporarily corrected position and the boundary point position included in the shape feature amount to output each axial component of the position vector as the corrected position command.

3. The trajectory control device according to claim 2, wherein
    the shape-feature determination unit extracts a portion in which a trajectory of the position command changes from a straight line to a curved line, and outputs a position of a boundary point thereof and a running direction immediately before the boundary point as the shape feature amount, and
    the position-vector correction unit designates a position at which the temporarily corrected position is shifted onto a reference straight line determined by the running direction immediately before the boundary point as the corrected position command, when the position command and the temporarily corrected position become opposite to each other with respect to the reference straight line near the boundary point, so as to compute the corrected position vector so that a position command before correction and a corrected position command do not have a positional relation with the commands being opposite to each other with respect to the reference straight line.

4. The trajectory control device according to claim 2, wherein
    the shape-feature determination unit extracts a portion in which a trajectory of the position command changes from a curved line to a straight line, and outputs a position of a boundary point thereof and a running direction immediately after the boundary point as the shape feature amount, and
    the position-vector correction unit designates a position at which the temporarily corrected position is shifted onto a reference straight line determined by the running direction immediately after the boundary point as the corrected position command, when the position command and the temporarily corrected position become opposite to each other with respect to the reference straight line near the boundary point, so as to compute the corrected position vector so that a position command before correction and a corrected position command do not have a positional relation with the commands being opposite to each other with respect to the reference straight line.

5. The trajectory control device according to claim 2, wherein the shape-feature determination unit extracts a portion in which a direction of a normal vector of a trajectory of the position command is inverted, and outputs a position of a boundary point thereof and a running direction at the boundary point as the shape feature amount, and the position-vector correction unit designates a position at which the temporarily corrected position is shifted onto a reference straight line determined by a running direction at the boundary point as the corrected position command, when the position command and the temporarily corrected position become opposite to each other with respect to the reference straight line near the boundary point, so as to compute the corrected position vector so that a position command before correction and a corrected position command do not have a positional relation with the commands being opposite to each other with respect to the reference straight line.

6. The trajectory control device according to claim 1, wherein the servo control unit includes a two-degree-of-freedom controller using a reference model unit, and the servo-system response-trajectory calculation unit outputs an output trajectory at the time of giving the position command to a model same as the reference model unit used in the servo control unit, as the servo-system response trajectory.

7. The trajectory control device according to claim 1, wherein the servo-system response-trajectory calculation unit outputs a trajectory obtained by subtracting a vector obtained by multiplying an acceleration vector of the position command at each time by a predetermined coefficient determined by responsiveness of the servo control unit from the trajectory of the position command, as the servo-system response trajectory.

* * * * *